Aug. 7, 1945.  F. R. HARRIS  2,381,446
EQUIPMENT FOR SHIPBUILDING
Original Filed March 19, 1943   4 Sheets-Sheet 1
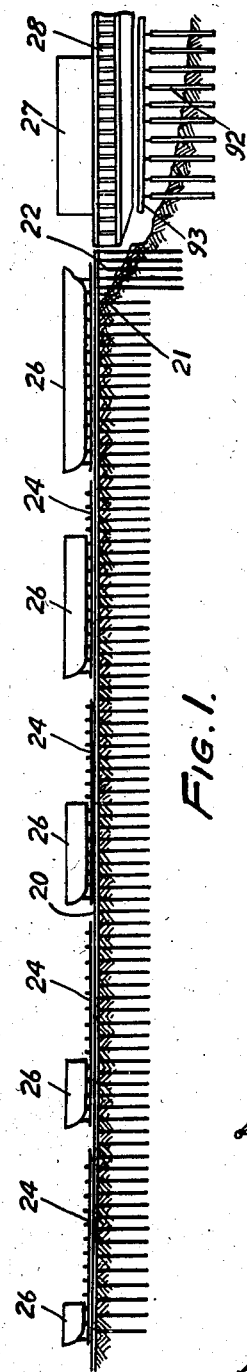
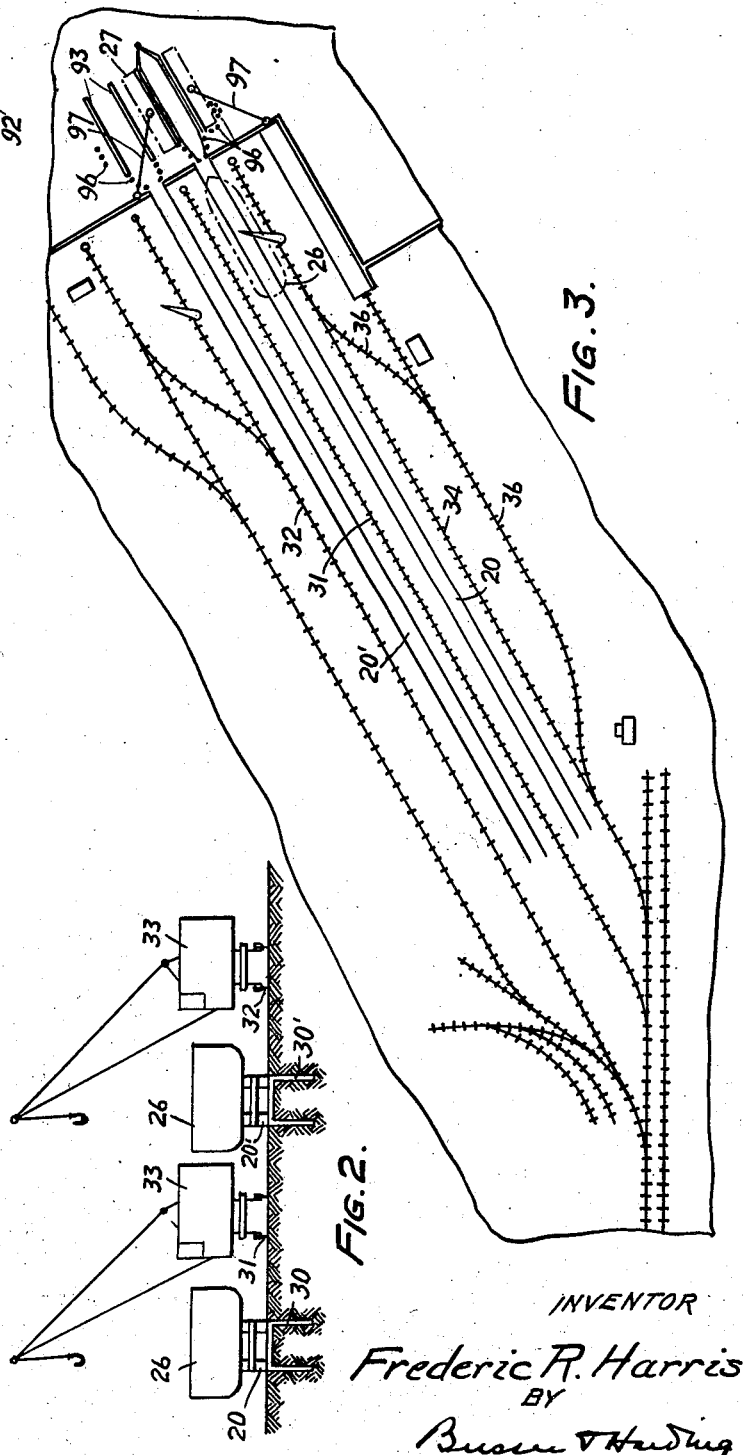
INVENTOR
Frederic R. Harris
BY
ATTORNEYS.

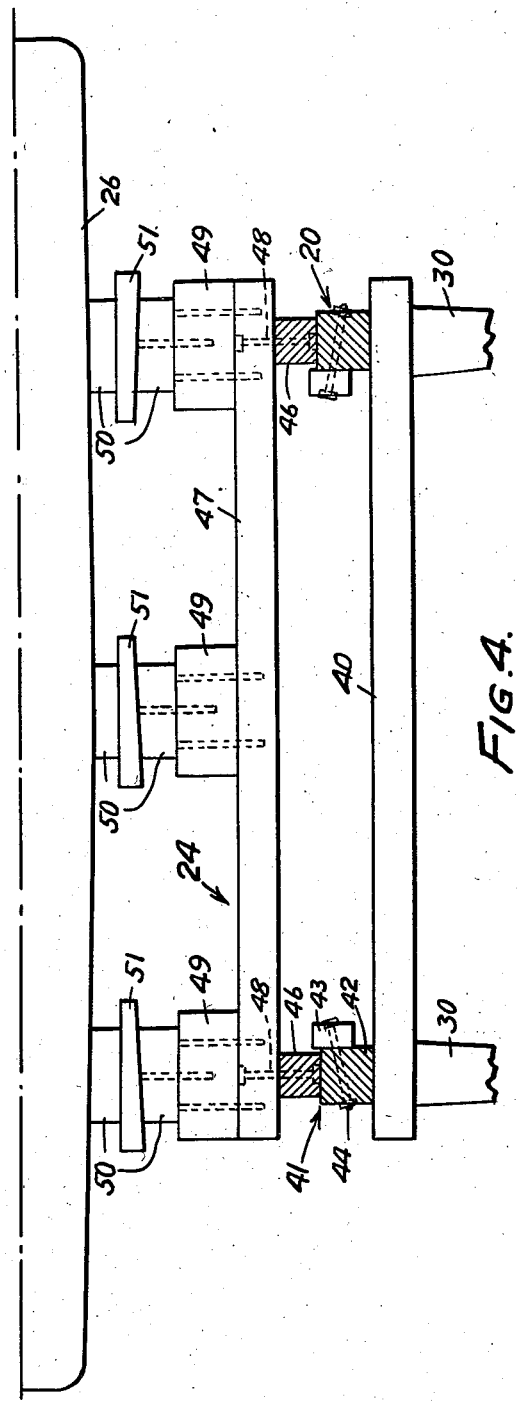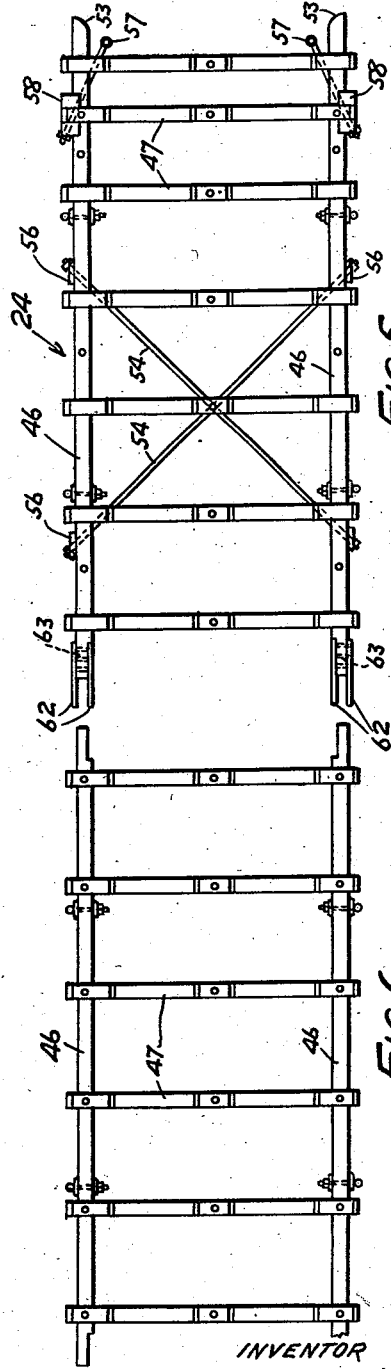

Aug. 7, 1945. F. R. HARRIS 2,381,446
EQUIPMENT FOR SHIPBUILDING
Original Filed March 19, 1943 4 Sheets-Sheet 3
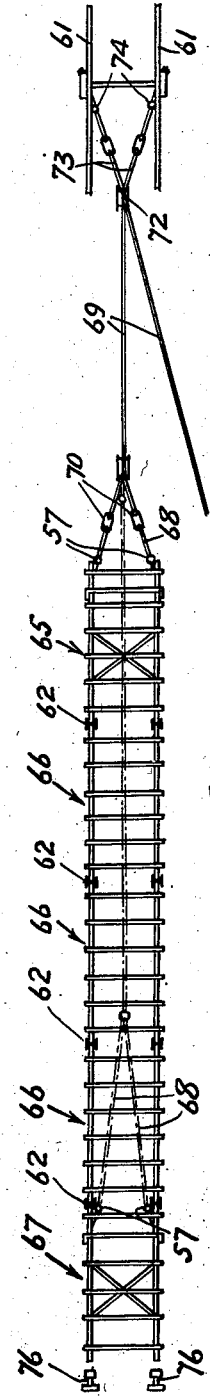
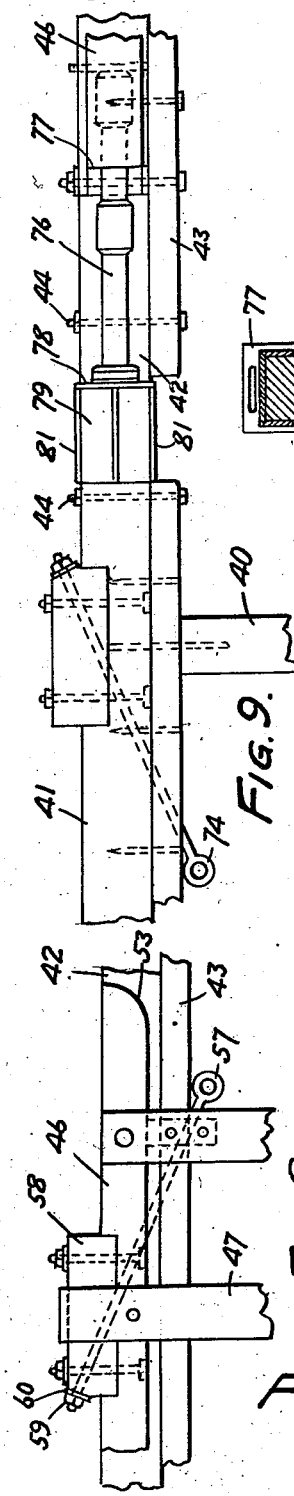
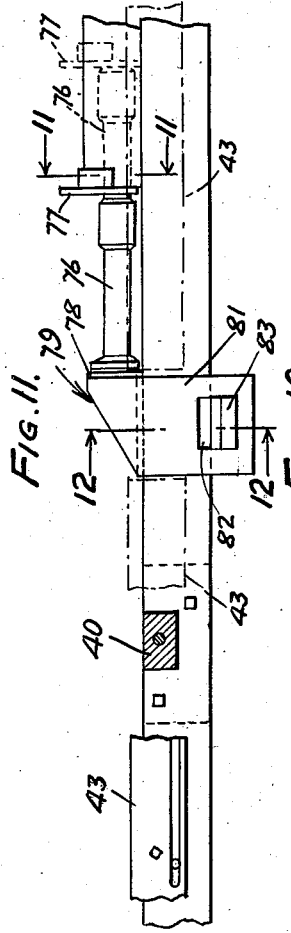
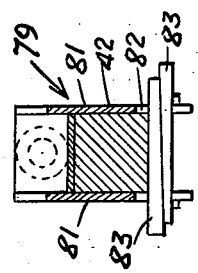
INVENTOR
*Frederic R. Harris.*
BY
ATTORNEYS.

Aug. 7, 1945.  F. R. HARRIS  2,381,446
EQUIPMENT FOR SHIPBUILDING
Original Filed March 19, 1943  4 Sheets-Sheet 4
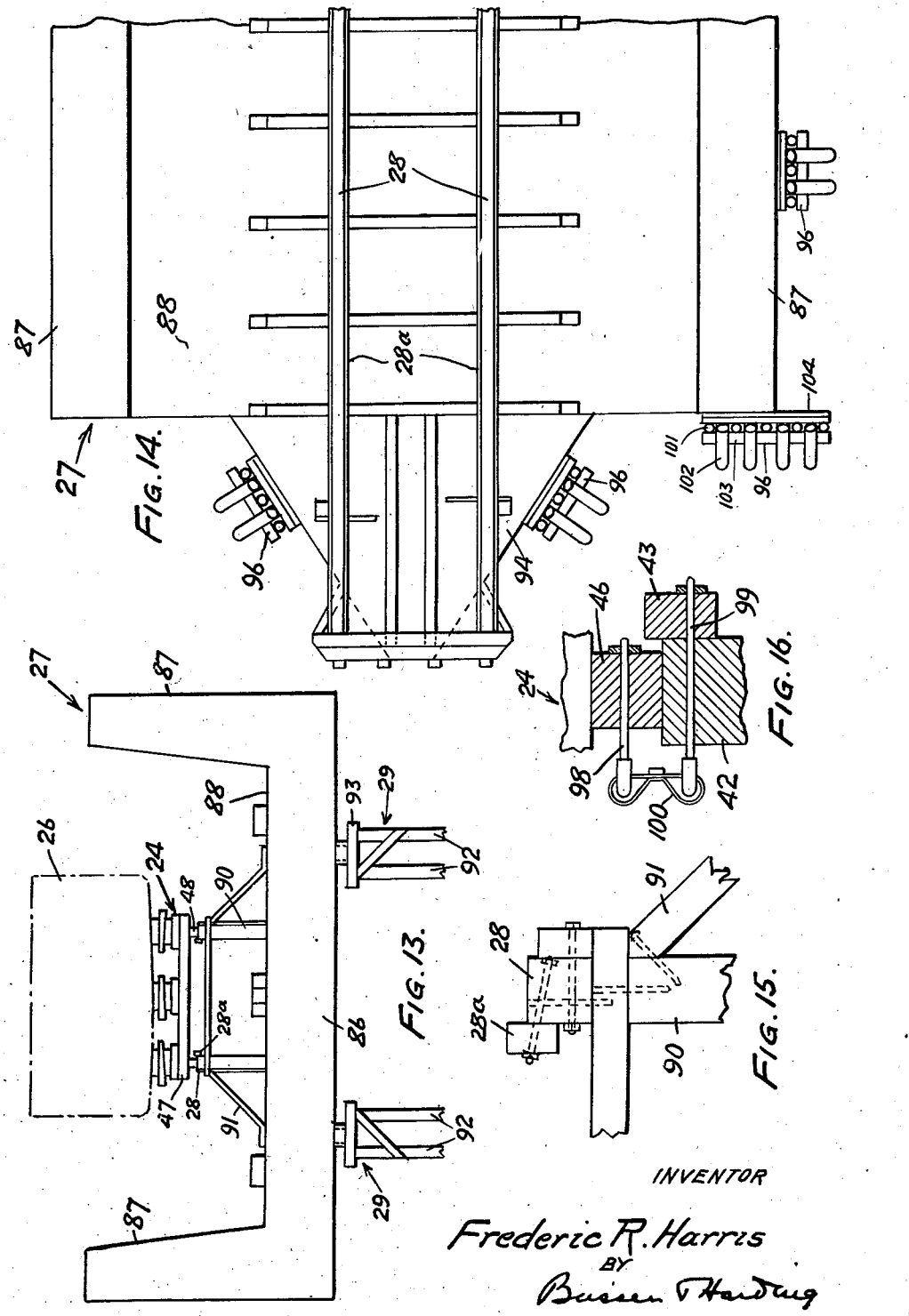
INVENTOR
Frederic R. Harris
BY
ATTORNEYS.

Patented Aug. 7, 1945

2,381,446

UNITED STATES PATENT OFFICE 2,381,446

EQUIPMENT FOR SHIPBUILDING

Frederic R. Harris, New York, N. Y., assignor to New Jersey Shipbuilding Corporation, Barber, N. J., a corporation of New Jersey Original application March 19, 1943, Serial No. 479,733. Divided and this application October 5, 1943, Serial No. 504,990

3 Claims. (Cl. 61—67.)

This invention relates to ship-building and ship-building equipment by which a number of ships can be constructed simultaneously on continuous ways.

One object of the invention is to provide an improved method of constructing ships; the ships being built on cradles that are movable along way rails. In the assembly of ships in accordance with this method, a number of hulls are under construction simultaneously at different places along the ways, so that each ship on the ways when its construction has progressed to final stage is ready to be floated.

Another object of the invention is to provide an improved method for moving ships from the ways into the water. In accordance with this feature of the invention, ships are constructed on ways, which may be horizontal instead of inclined in the usual manner, and the ship is transferred from the horizontal ways to a floating dry dock. After the transfer, the floating dry dock is moved out from shore and submerged sufficiently to cause the ship to float.

In its broadest aspects, the method of transferring the ship to the floating dry dock is not limited to the removal of a ship from ways. It may be said therefore, that it is another object of the invention to provide an improved method for transferring a conveyance from a track on shore to another track on a supporting carrier or vessel.

Another aspect of the invention relates to shipyard equipment including continuous ways for ships in various stages of construction, and cradles on the ways for supporting the ships and for moving them along the ways.

Other objects, features and advantages of the invention will appear or be pointed out as the specification proceeds.

In the drawings, forming a part hereof, in which like reference characters denote corresponding parts in all the views:

Figure 1 is a side elevation showing continuous ways supporting a number of cradles with ships in construction, and showing a floating dry dock at the end of the ways in position for receiving a completed hull;

Figure 2 is an end view showing two parallel pairs of ways and showing rails with cranes for placing prefabricated ship sections on the cradles;

Figure 3 is a plan view, on a reduced scale, showing a shipyard with equipment for constructing ships in accordance with this invention;

Figure 4 is an enlarged detail sectional view taken through the way rails and showing an end elevation of one of the cradles and a full-width portion of a ship supported on the cradle;

Figure 5 is a top plan view, on a reduced scale, of the front section of the cradle shown in Figure 4, without a ship;

Figure 6 is a plan view of another section of the cradle;

Figure 7 is a top plan view, on a reduced scale, showing sections connected together to form a composite cradle, and illustrating the apparatus for moving the cradle along the ways;

Figures 8 and 9 are enlarged detail views showing the construction of the way rails, Figure 9 illustrating the manner in which a cradle is jacked to overcome its initial starting inertia;

Figure 10 is a side elevation of the structure shown in Figure 9;

Figures 11 and 12 are sectional views taken along the lines 11—11 and 12—12 respectively of Figure 10;

Figure 13 is an end view of the dry dock with ways located above the dry dock deck, and showing the subaqueous structure by which the dry dock is supported at the correct level for transfer of a cradle from the ways on shore to the ways on the dry dock;

Figure 14 is a top plan view of the dry dock shown in Figure 13, and the slip by which the dry dock is held in alignment with the ways on shore;

Figure 15 is an enlarged detail view showing one of the way rails on the dry dock and the structure by which it is supported; and Figure 16 is an enlarged sectional view through one of the way rails and cradle runners with connecting means for preventing movement of the cradle runner along the way rail.

Figure 1 shows continuous ways 20, which in the illustrated embodiment are horizontal and extend slightly beyond the shore line 21, the water-end of the ways 20 being supported on piling 22. The ways 20 are long enough to support a number of separate cradles 24 on which ship hulls 26 are built, and are preferably not inclined but horizontal instead.

Sections of the hulls 26 are prefabricated away from the ways 20 and assembled on the cradles 24, which are first lined up on the ways 20. Figure 1 shows, for example, the first cradle at the left with a single section thereon; the other cradles, which are movable along the ways, illustrating hulls in more advanced stages. The ships are built simultaneously, and as each ship is completed, it must be moved on its cradle as far as necessary towards the shore for transfer to the dry dock 27 to be launched.

There are ways 28 above the deck of the floating dry dock 27. These ways 28 are designed to connect with and form a continuation of the shore ways 20 when the dry dock 27 is properly positioned. The equipment for positioning the floating dry dock 27 includes a slip for aligning the dry dock with the shore ways 20, and a subaqueous supporting structure 29 that is under the dry dock 27 and on which the dry dock rests when it is partially flooded. The supporting structure 29 is at such a level that when the bottom of the dry dock 27 rests on these supporting means, the ways 28 of the dry dock are at exactly the same level as the shore ways 20. This method of positioning the floating dry dock 27 has the advantage that the level of the dry dock is not affected by the tide, and it is not necessary to have any bridge connecting the shore ways with those on the floating dock. Further, all guesswork, trial and adjustment are eliminated.

As previously pointed out, this feature of the invention by which the way rails on the floating dry dock are brought into register with the way rails on shore is not necessarily limited to shipyards. If means are provided for partially floating the pontoons of barges that carry railway cars, and a subaqueous structure provided on which the pontoon can rest, the same method as used in this invention for transferring a ship cradle from shore ways to a floating dry dock can be employed for shifting freight cars from tracks on shore to tracks on a barge or other floating vessel.

Since the floating dry dock 27 is in use for a comparatively small portion of time, greater efficiency can be obtained by having other continuous ways 20' (Fig. 2), and using the same floating dry dock 27 to take ships from both of the ways 20 and 20'. This can be done most efficiently if the work on the respective ways 20 and 20' is scheduled so that the ships become ready for transfer to the water at different times.

Figure 2 shows the ways 20 and 20' supported on suitable foundations 30 and 30' respectively. There are railway tracks 31 and 32 extending along the ways. In Figure 2 these tracks support cranes 33 that are used to bring sections into position for connection with the already-completed portions of the hulls 26.

Figure 3 is a plan view of a shipyard showing the parallel ways 20 and 20', and the railway tracks 31 and 32. Other tracks are shown for bringing the cars into position for unloading at the various locations at which ships are being constructed. Because of the small scale of Figure 3, the cradles on the ways 20 and 20' are not illustrated, and only one of the hulls 26 is indicated. It will be evident, however, that cars can be moved along the track 34 and stopped for unloading at the different regions where hulls are under construction.

A side track 36 is provided for returning the cars so that there need be no interruption in the flow of material to the various locations along the ways 20 when empty cars have to be returned. Various other tracks and side tracks are shown in Figure 3 and these can be used in various ways, depending partly on the weight of the hull sections that are carried on the cars. For example, if the ships are built of prefabricated hull sections of such weight that two cranes are necessary to move the sections into place on the cradles, the arrangement of tracks in Figure 3 makes it possible to bring two cranes into position for unloading such sections from a flat car.

Figure 4 shows the construction of the ways 20 with foundations 30 connected together by cross-ties 40. Each of the way rails 41 comprises a supporting rail 42 and a guide rail 43 rigidly connected to the supporting rail 42 by fastening means, such as bolts 44. The way rails are preferably constructed of timber.

The cradle 24 has heavy timber runners 46 that bear on the supporting rails 42. The runners 46, on opposite sides of the cradle 24, are connected by cross-beams 47 that are rigidly connected to the runners by bolts 48. Blocks 49 mounted on the cross-beams 47 of the cradle, support the weight of ship hull 26. Auxiliary blocks 50 and wedges 51 are used as fillers between the supporting blocks 49 and the bottom of the ship hull 26, in a manner well understood in the ship-building art.

The runners 46 slide longitudinally along the top surfaces of the supporting rails 42, and the guide rails 43 prevent transverse displacement of the runners 46. The guide rails 43 are preferably on the inside of the way rails 41, and the forward end of the runners 46 have curved surfaces 53 (Fig. 5) for preventing the runners 46 from catching on the ends of successive guide rail sections after interruptions in the guide rail or at joints where the sections are not in perfect alignment.

Figure 5 shows diagonal bracing 54 connecting the runners 46 on opposite sides of the cradle 24 to give greater rigidity to the cradle. The bracing 54 comprises metal tie rods that extend through the runners 46 and through blocks 56 on the outer sides of the runners. This diagonal bracing 54 is merely illustrative of the cradle-reinforcing braces, the number and size of which depend upon the size of the cradle.

There are eye bolts 57 at the forward end of the cradle 24 for pulling the cradle along the ways. In order to provide a strong connection between the eye bolts 57 and the runners 46 of the cradle, blocks 58, best shown in Figure 8, are recessed into the outer sides of the runners 46, and the eye bolts 57 extend through the runners 46 and through the blocks 58. An angular face at the rearward end of each of the blocks 58 extends at right angles to the axis of the eye bolt 57 and provides a surface against which the eye bolt nut 59 can clamp a washer 60 for more uniform distribution of the pulling stress.

The cradle 24 is preferably made in sections. Figure 5 shows the first section, and Figure 6 shows a subsequent section. The cradle section shown in Figure 6 is essentially the same as the forward cradle section of Figure 5, except that it does not have the rounded end surfaces 53 or the eye bolts 57. In Figure 6 the forward ends of the runners 46 are shaped to extend between splice plates 62 that are used to connect the different sections together to form a long, composite cradle. The intermediate sections of the cradle are usually not provided with diagonal bracing, such as the bracing 54 of Figure 5, since these intermediate cradle sections are braced by the other sections at both ends and are not subject to such heavy distorting stresses.

The splice-plate connections between adjacent sections of the cradle are similar to the fish plate connections between railroad rails, there being splice plates on both sides of the runners 46 and bolts 63 extending through the end portions of the runners and clamping the splice plates securely against the side surfaces of the runners.

Figure 7 shows a full length cradle made up of five sections including an end section 65 similar to the end section shown in Figure 5, three intermediate sections 66, similar to the cradle section shown in Figure 6, and a rearward end section 67. The splice plates connecting different sections are indicated by the reference characters 62. The rearward end section 67 is similar in construction to the forward end section 65 except that the forward ends of the runners of section 67 are shaped for connection with splice plates 62.

The rearward cradle section 67 has eye bolts 57 to which cables 68 are connected for pulling the composite cradle along the ways. Other cables 68 are connected with the eye bolts 57 of the forward section 65, and all of the cables 68 connect with a common center cable 69. Turn buckles 70, or other means, are provided for adjusting the length of certain of the cables 67 so that the pull of the central cable 69 is transmitted substantially evenly to all of the cables 68. In this way pulling force is applied equally to both the forward and rearward cradle sections 65 and 67, and the pull on the splice plates 62 is reduced.

The central cable 69 passes around a pulley 72 which is held in place by cables 73 connected to stationary eye bolts 74 fastened to the way rails 41. A detail view showing the connection of one of the eye bolts 74 with a way rail 41 is shown in Figure 9. This construction is similar to the connection of the eye bolt 57 with the cradle runner 46 shown in Figure 8, and provides a secure anchor against which the pulling force of the central cable 69 can react.

After passing around the pulley 72, the central cable 69 leads to a crane or other means capable of exerting a continuous pull on the cable 69 during movement of the cradle for a considerable distance.

The force required to overcome the initial inertia and start the movement of a loaded cradle along the ways is much larger than the force required to keep the cradle moving. In order that the mechanism for pulling the cable 69 need not be strong enough to overcome this initial starting inertia, other means are provided for starting the movement of the cradle. Such other means preferably comprise jacks that push against the rearward ends of the cradle runners.

Figure 9 shows a jack 76 that presses against a metal cap 77 on the rearward end of the cradle runner 46. The purpose of the cap 77 is to prevent the jack 76 from spreading and splitting the end of the runner 46. The jack 76 reacts against a surface 78 of a saddle 79 that fits on the supporting rail 42. The saddle 79 has side members 81, best shown in Figures 10 and 12, that extend down beyond the bottom of the supporting rail 42. There are holes 82 near the lower ends of both of the side members 81, and steel wedges 83 are driven through the holes 82 in such a manner as to clamp the saddle 79 firmly against the supporting rail 42. The steel wedges 83 can be driven out to release the saddle 79 when it is to be moved into a different location along the way rail.

The distance that the cradle can be displaced by the jack 76 is, of course, quite limited, but the purpose of the jack 76 is merely to overcome the starting inertia of the cradle and once this is done the cradle is kept in motion by the pull of the cable 69. Figures 9 and 10 show in broken lines the position that the head of the jack 76 occupies when the jack is extended. This extension of the jack displaces the metal cap 77 from the solid line position to the broken line position indicated in the drawings. Whenever a cradle is to be moved, the saddle 79 is placed on the way rail a short distance behind the rearward end of the cradle runner, and wedged against displacement by the steel wedges 83. The correct position for the saddle 79 depends upon the length of the jack 76 when its ram is contracted. Openings in the guide rails 43 are provided at the regions where the saddle 79 is to be used. There are similar jacking means behind both runners of the cradle as indicated in Fig. 7.

The dry dock 27 is shown in Figure 13 and comprises a pontoon 86 with wing walls 87. The dry dock has a deck 88, and way rails 28 supported by uprights 90 and diagonal bracing 91 on the deck 88. The subaqueous structure 29 includes piles 92 with their lower ends embedded in the ground and their upper ends connected by longitudinal members 93 on which the bottom of the pontoon 86 rests when partially flooded. The dry dock way rails 28 extend somewhat beyond the end of the pontoon on an outrigger platform 94 shown in Figure 14. The platform 94 is preferably provided with converging sides to assist in centering the dry dock in its slip.

The dry dock slip does not have continuous sides in the illustrated embodiment of the invention. The term "slip" is used herein to denote piling or pile supported structure for confining the dry dock or carrier against lateral movement. The slip includes groups of piling 96 and connecting facing with which the dry dock is in contact when its ways are in line with the ways on shore. Figure 3 shows mooring cables 97 for holding the dry dock 27 in the slip.

Although the runners 46 of the cradles or supports and the supporting rails 42 of the ways are well greased to reduce as much as possible the frictional resistance to movement of the cradles, it is desirable to prevent movement of the cradles on the ways during the time that new hull sections are being placed in position on the cradle. Figure 16 shows pins 98 and 99 that extend through holes in the runner 46 and rail 42 respectively. These pins project from the sides of the runner and rail and have eyes into which a connector 100 fits to join the pins 98, 99 and lock the cradle 24 against movement lengthwise of the way rails.

Obviously, several sections instead of only one can be started on the first cradle 24 at the left, Figure 1. In fact, if delivery to the ways is fast enough, each cradle can be supplied with enough sections, all at once or at different times, to complete several ships simultaneously. The ships can then be moved one by one upon the dock, and the whole row launched very quickly. The essence of the invention is the construction of several ships at the same time upon separate supports or cradles arranged in convenient locations to receive the sections of which the hulls are made, and the launching of the ships as fast as they are completed. The number of sections received by each cradle at any time and joined thereon may, of course, be varied in practice, depending upon the speed and amount of material delivered and working conditions at different points along the ways as operations proceed.

The preferred embodiment of the invention has been described, but changes and modifications can be made and some features of the invention can be used without others.

I claim:

1. The combination of ways on which a ship is constructed on shore, a floating dry dock with a deck and ways above the deck designed to register with the ways on shore, centering guides for positioning the dry dock in line with the ways on shore, supporting means embedded in the subaqueous soil and extending under the dry dock at such a level that when the dry dock is submerged until it rests on said supporting means, the ways on the dry dock are at the level of the ways on shore.

2. Apparatus for transferring a loaded conveyance from rails on shore to the rails on a deck of a floating vessel, said apparatus comprising centering means for locating the vessel with the ends of its rails in line with the rails on shore, and supporting means embedded in the subaqueous soil and extending under at least a portion of the vessel for supporting the vessel when partially submerged by flooding, the level of the supporting means being such that when the vessel is resting on said supporting means the rails on the vessel are at the level of the rails on the shore.

3. Apparatus for constructing ships on shore and for placing them in the water, said apparatus comprising continuous ways long enough for the simultaneous construction of a number of ships, a number of different cradles on the ways and movable along the ways for supporting the respective ships, a floating dry dock at one end of the ways, a slip for centering the dry dock in line with the ways, piling in the subaqueous soil that is under the dry dock when the dry dock is in the slip, horizontal supports carried by the piling at such a level that the floating dry dock when partially flooded and resting on the horizontal supports is at a level for direct transfer of a cradle from said ways to the dry dock.

FREDERIC R. HARRIS.